(12) United States Patent
Pak et al.

(10) Patent No.: US 12,506,955 B2
(45) Date of Patent: Dec. 23, 2025

(54) ELECTRONIC APPARATUS FOR OBTAINING BIOMETRIC INFORMATION OF COMPANION ANIMAL, AND OPERATION METHOD THEREOF

(71) Applicant: PETNOW INC., Daejeon (KR)

(72) Inventors: Dae Hyun Pak, Seoul (KR); Joon Ho Lim, Seoul (KR)

(73) Assignee: PETNOW INC., Daejeon (KR)

( * ) Notice: Subject to any disclaimer, the term of this patent is extended or adjusted under 35 U.S.C. 154(b) by 0 days.

(21) Appl. No.: 18/560,918

(22) PCT Filed: Dec. 9, 2022

(86) PCT No.: PCT/KR2022/019991
§ 371 (c)(1),
(2) Date: Nov. 14, 2023

(87) PCT Pub. No.: WO2023/106874
PCT Pub. Date: Jun. 15, 2023

(65) Prior Publication Data
US 2024/0314426 A1  Sep. 19, 2024

(30) Foreign Application Priority Data

Dec. 10, 2021 (KR) .................. 10-2021-0177064
Sep. 7, 2022 (KR) .................. 10-2022-0113809
Dec. 8, 2022 (KR) .................. 10-2022-0170852

(51) Int. Cl.
*H04N 23/60* (2023.01)
*G06V 10/40* (2022.01)
(Continued)

(52) U.S. Cl.
CPC ............. *H04N 23/64* (2023.01); *G06V 10/40* (2022.01); *G06V 40/10* (2022.01); *H04N 23/62* (2023.01);
(Continued)

(58) Field of Classification Search
CPC ...... H04N 23/64; H04N 23/62; H04N 23/633; H04N 23/667; H04N 23/71; H04N 23/73;
(Continued)

(56) References Cited

U.S. PATENT DOCUMENTS 10,674,072 B1 * 6/2020 Manzari ................. H04N 23/74
11,019,250 B2 5/2021 Choi et al.
(Continued)

FOREIGN PATENT DOCUMENTS

KR  10-2011-0007437  1/2011
KR  10-2016-0017463  2/2016
(Continued)

OTHER PUBLICATIONS

PCT ISR.
European Search Report mailed Jul. 23, 2025.

*Primary Examiner* — Usman A Khan

(57) ABSTRACT

An electronic apparatus for obtaining biometric information of a companion animal, and an operation method thereof are proposed. The electronic apparatus includes a display, a front camera configured to capture an image in a display direction of the display, a processor functionally coupled to the display and the front camera, and a memory functionally coupled with the processor. The processor captures the image of the companion animal through the front camera, outputs the image of the companion animal through the display, extracts a feature object from the image of the companion animal, and stores an image of the feature object in the memory.

14 Claims, 22 Drawing Sheets

(51) Int. Cl.
*G06V 40/10* (2022.01)
*H04N 23/62* (2023.01)
*H04N 23/63* (2023.01)
*H04N 23/667* (2023.01)
*H04N 23/71* (2023.01)
*H04N 23/73* (2023.01)

(52) U.S. Cl.
CPC ......... *H04N 23/633* (2023.01); *H04N 23/667* (2023.01); *H04N 23/71* (2023.01); *H04N 23/73* (2023.01)

(58) Field of Classification Search
CPC ........ H04N 23/60; G06V 10/40; G06V 40/10; G06V 10/17; A61B 5/0077; A61B 5/6898; A61B 2503/40; A61B 5/1171; G06F 18/00
USPC ...................................................... 348/262
See application file for complete search history.

(56) References Cited

U.S. PATENT DOCUMENTS

| | | | |
|---|---|---|---|
| 11,223,771 B2 | 1/2022 | Manzari et al. | |
| 11,410,466 B2 | 8/2022 | Lee et al. | |
| 2002/0116390 A1* | 8/2002 | Meadows | G06Q 10/10 382/110 |
| 2003/0076997 A1* | 4/2003 | Edanami | G06V 40/10 382/218 |
| 2012/0033127 A1* | 2/2012 | Uenishi | H04N 23/635 348/E5.045 |
| 2012/0268608 A1* | 10/2012 | Watanabe | H04N 23/695 348/169 |
| 2012/0274785 A1* | 11/2012 | Takeuchi | H04N 23/73 348/169 |
| 2013/0069978 A1* | 3/2013 | Tanaka | G06V 40/10 382/110 |
| 2013/0258118 A1* | 10/2013 | Felt | H04N 9/643 348/207.1 |
| 2015/0078626 A1* | 3/2015 | Kinard | A01K 11/00 382/110 |
| 2015/0332086 A1* | 11/2015 | Shakib | G06F 16/51 382/118 |
| 2016/0095292 A1* | 4/2016 | Hosseini | H04N 1/00209 348/161 |
| 2018/0227481 A1* | 8/2018 | Kimura | H04N 23/63 |
| 2019/0098213 A1 | 3/2019 | Kim et al. | |
| 2019/0258849 A1* | 8/2019 | Polimeno | G06V 40/16 |
| 2019/0297252 A1* | 9/2019 | Choi | G06V 40/10 |
| 2019/0347500 A1* | 11/2019 | Lee | G06V 40/197 |
| 2020/0060240 A1* | 2/2020 | Yajima | A01K 13/00 |
| 2020/0125842 A1 | 4/2020 | Gousev et al. | |
| 2021/0321034 A1* | 10/2021 | Okamoto | H04N 23/611 |
| 2022/0053142 A1 | 2/2022 | Manzari et al. | |
| 2022/0294992 A1 | 9/2022 | Manzari et al. | |

FOREIGN PATENT DOCUMENTS

| | | |
|---|---|---|
| KR | 10-2019-0038518 | 4/2019 |
| KR | 10-2019-0130448 | 11/2019 |
| KR | 10-2021-0074017 | 6/2021 |
| KR | 10-2021-0145278 | 12/2021 |

\* cited by examiner

ELECTRONIC APPARATUS FOR OBTAINING BIOMETRIC INFORMATION OF COMPANION ANIMAL, AND OPERATION METHOD THEREOF

TECHNICAL FIELD

The present disclosure relates to an electronic apparatus for obtaining biometric information of a companion animal, and a method of operating the electronic apparatus.

BACKGROUND ART

In modern society, demand for companion animals that may be emotionally relied on while living with people is increasing. For various additional services such as the life cycle management and health management of the companion animals, there are increasing requirements to store and manage information about the companion animals in a database. In this regard, information for identifying individual companion animals is required, and respective objects that may be used according to the companion animals may be defined. For example, similar to human fingerprints, it is known that dog noseprints (i.e., shapes of nose creases) are all different for each individual, and in general, it is known that when a puppy becomes an adult dog (of six months), a characteristic of the dog's noseprints does not change for the rest of its life cycle. Accordingly, in the case of dogs, noseprints may be used as a means for identifying dog's identities.

However, unlike a human who can take specific postures or using various sensors, it is not easy for a companion animal to take specific postures or use the sensors. Since verbal communication with the companion animal is not possible, a method of forcibly fixing the companion animal in the specific postures or contacting the sensors by using physical force or a means such as a fixing frame may be taken into account. However, such a method may be undesirable in terms of protecting the rights of companion animals and the reluctance of companion animal guardians. In addition, since the method requires a person to forcibly fix the companion animal and a person to manipulate a biometric information acquisition device separately, there is a practical problem that it is difficult for a user to proceed with obtaining of biometric information alone.

DISCLOSURE

Technical Problem

The present disclosure provides an electronic apparatus and an operation method of the electronic apparatus configured to enable a photographer to check a scene being photographed in real time in obtaining biometric information of a companion animal by using a camera, so that photographing may be easily performed.

The problems to be solved of the present disclosure are not limited to those mentioned above, and other problems not mentioned will be clearly understood by those skilled in the art from the following description.

Technical Solution

An electronic apparatus for obtaining biometric information of a companion animal includes: a display; a front camera configured to capture an image in a display direction of the display; a processor functionally coupled to the display and the front camera; and a memory functionally coupled with the processor. The processor may capture the image of the companion animal through the front camera, display the image of the companion animal through the display, extract a feature object from the image of the companion animal, and store an image of the feature object in the memory.

According to the present disclosure, the processor may overlap a graphic or message at a position of the feature object in the image of the companion animal, and output the companion animal's image overlapped with the graphic or message through the display.

According to the present disclosure, the graphic or message may represent a photographing state of the feature object.

According to the present disclosure, the electronic apparatus may further include a touch sensor provided in a display area of the display. The processor may obtain, from the touch sensor, a position of a contact object or attachment, which has come into contact with the display, and control the front camera to set a focus to the position of the contact object or attachment.

According to the present disclosure, the processor may display a marker on a display area of the display and track a position of the feature object, so as to move the marker so that the marker overlaps the feature object and to control the front camera so that a focus is set to a position of the marker.

According to the present disclosure, the processor may determine a position or posture of the companion animal from the image of the companion animal, and output, through the display, a graphic or message for guiding photographing based on the position or the posture of the companion animal.

According to the present disclosure, the electronic apparatus may further include a gyroscope sensor for measuring a posture of the electronic apparatus. The processor may obtain posture information of the electronic apparatus from the gyro sensor, and determine a reverse direction of the image based on the posture information.

According to the present disclosure, the electronic apparatus may further include an illuminance sensor for measuring illuminance around the electronic apparatus. The processor may obtain illuminance information on the illuminance around the electronic apparatus from the illuminance sensor, and control exposure of the front camera according to the illuminance information.

According to the present disclosure, the electronic apparatus may further include a rear camera for capturing an image in a direction opposite to the display direction of the display. The processor may check attribute information of the front camera, and determine whether activation of the front camera is possible based on the attribute information of the front camera.

According to the present disclosure, the attribute information of the front camera may include whether manual focus is supported or not, a photographing format, and a photographing size.

According to the present disclosure, the processor may output, through the display, the attribute information of the front camera and whether the activation of the front camera is possible.

According to the present disclosure, the processor may activate the rear camera when the activation of the front camera is not possible.

According to the present disclosure, when the activation of the front camera is possible, the processor may output, through the display, an interface for selecting one of the front camera and the rear camera.

According to the present disclosure, the processor may evaluate quality of the image of the feature object, and transmit the image of the feature object satisfying quality conditions to a server through a communication module, and the quality evaluation conditions may be set to be different depending on whether a camera capturing the image of the feature object is the front camera or the rear camera.

According to the present disclosure, a method of operating an electronic apparatus for obtaining biometric information of a companion animal includes: capturing an image of the companion animal through a front camera; outputting the image through a display; extracting a feature object from the image; and storing an image of the feature object in a memory. The front camera may capture an image in a display direction of the display.

Advantageous Effects

According to the present disclosure, in photographing the companion animal, the image of the companion animal is captured by the front camera that captures the image in the display direction of the display, so that a user may check the image of the companion animal being photographed in real time and the companion animal's biometric information more suitable for identification or study may be obtained.

Effects of the present disclosure are not limited to those mentioned above, and other effects not mentioned will be clearly understood by those skilled in the art from the following description.

MODE FOR INVENTION

Figure 1:
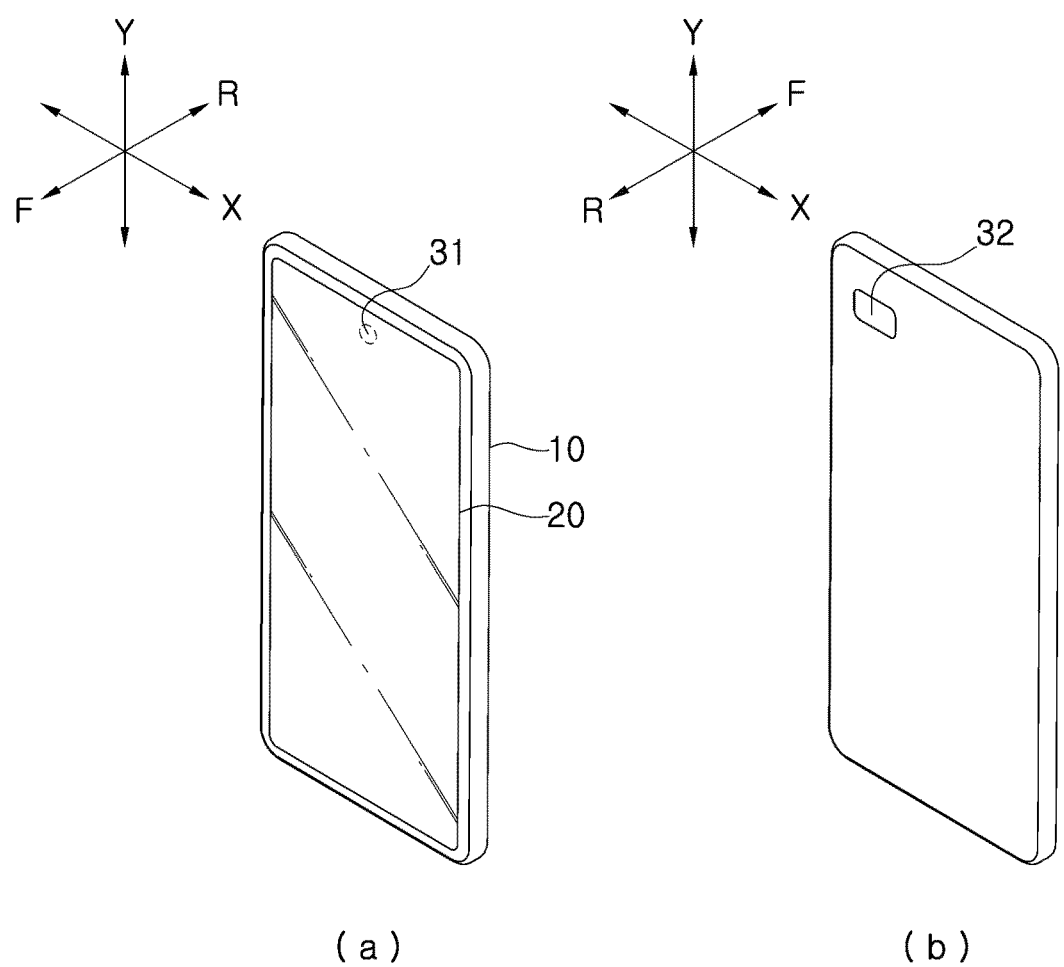
FIG. 1 is a view illustrating an example of an electronic apparatus provided with a front camera mounted inside a display area of the electronic apparatus.

Hereinafter, exemplary embodiments of the present disclosure will be described in detail with reference to the accompanying drawings so that those skilled in the art can easily implement the present disclosure. The present disclosure is not limited to the exemplary embodiments described herein and may be embodied in many different forms.

In order to clearly describe the present disclosure, parts irrelevant to the description are omitted, and the same reference numerals designate the same or similar components throughout the specification.

In addition, in various exemplary embodiments, components having the same configuration will be described only in representative exemplary embodiments by using the same reference numerals, and in other exemplary embodiments, only configurations different from the representative exemplary embodiments will be described.

Throughout the specification, when a part is said to be "connected or coupled" to another part, an expression such as "connected or coupled" is intended to include not only "directly connected or coupled" but also "indirectly connected or coupled" having a different member in the middle thereof. In addition, when a part is said to "include" or "comprise" a certain component, it means that it may further include or comprise other components, except to exclude other components unless the context clearly indicates otherwise.

Unless otherwise defined, all terms including technical and scientific terms used herein have the same meaning as commonly understood by those skilled in the art to which the present disclosure belongs. It will be further understood that terms as defined in dictionaries commonly used herein should be interpreted as having a meaning that is consistent with their meaning in the context of this specification and the relevant art and will not be interpreted in an idealized or overly formal sense unless expressly so defined herein.

The present disclosure is intended to provide an electronic apparatus 1 for obtaining biometric information of a companion animal, and a method of operating the electronic apparatus 1. The companion animal's biometric information is obtained in order to verify a companion animal's identity. The companion animal's biometric information includes information on an iris, a facial shape, a body shape, and a nose crease shape (i.e., noseprint). In the present document, descriptions will be focused on content in which dog's noseprints, as the companion animal's biometric information, are photographed, but in the present disclosure, the scope of companion animals is not limited to dogs. In addition, features used as the identification information are not limited to the noseprints, but various physical features of the companion animals may be used.

According to the present disclosure, the electronic apparatus 1 photographs a companion animal by using a front camera 31 and obtains biometric information of the companion animal from the photographed image. The front camera 31 refers to a camera provided in a direction in which a display 20 of the electronic apparatus 1 faces. The electronic apparatus 1 may be a mobile device such as a smart phone or tablet. In addition, the electronic apparatus 1 may correspond to a computing device (e.g., a laptop computer or desktop computer). In a case of a mobile device having a foldable form such as a foldable phone, a front camera 31 may exist for each state before and after the foldable mobile device is folded. In the electronic apparatus 1 according to the present disclosure, the front camera 31 may be provided inside or outside the display 20.

Figure 2:
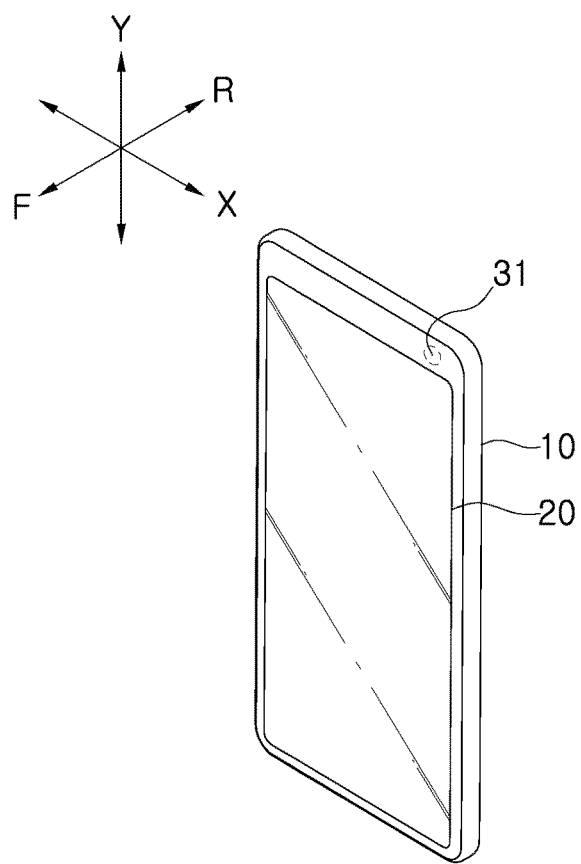
FIG. 2 is a view illustrating an example of an electronic apparatus provided with a front camera mounted outside a display area of the electronic apparatus.

FIG. 1 is a view illustrating an example of an electronic apparatus 1 provided with a front camera 31 mounted inside a display area of the electronic apparatus. FIG. 1(*a*) illustrates the front F of the electronic apparatus 1 in which the front camera 31 is mounted inside the display area, and FIG. 1(*b*) illustrates the rear R of the electronic apparatus 1. The exterior of the electronic apparatus 1 may include a frame 10, a display 20, a front camera 31, and a rear camera 32. In FIG. 1, the front camera 31 may be configured inside the display area of the display 20. Each of the front camera 31 and rear camera 32 may be configured to include a plurality of cameras. Meanwhile, as shown in FIG. 2, the front camera 31 may be mounted outside the display area.

Figure 3:
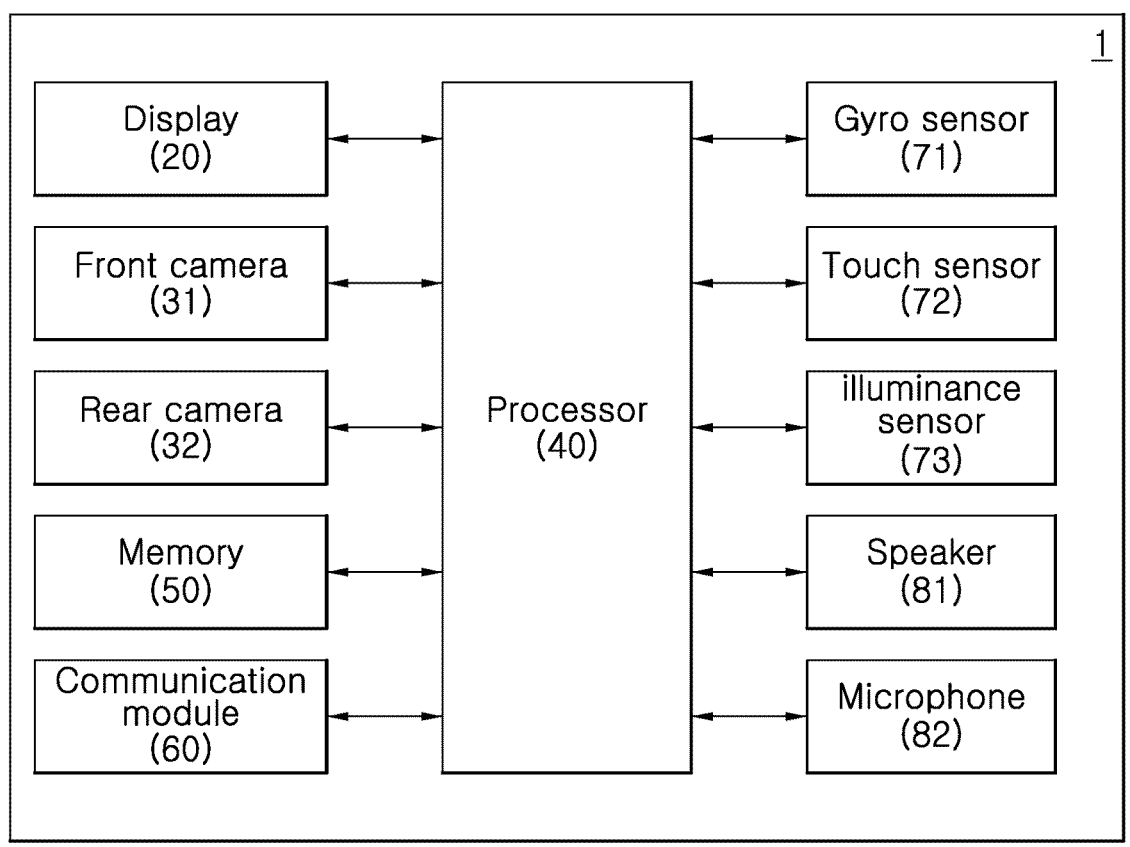
FIG. 3 is a block diagram illustrating a configuration of an electronic apparatus according to the present disclosure.

Referring to FIG. 3, the electronic apparatus 1 according to the present disclosure includes a display 20, a front camera 31, a processor 40, and a memory 50. Optionally, the electronic apparatus 1 may further include a rear camera 32. Optionally, the electronic apparatus 1 may further include a gyro sensor 71, a touch sensor 72, or an illuminance sensor 73. Optionally, the electronic apparatus 1 may further include a communication module 60, a speaker 81, or a microphone 82.

The display 20 is a device for outputting visual information. The display 20 may include a panel and a control circuit. The touch sensor 72 may be provided on the panel. In particular, the display 20 may output an image (i.e., a preview image, a captured image frame, etc.) of a companion animal being photographed. In addition, the display 20 may output an interface for providing information to a user in a process of obtaining biometric information of the companion animal.

The camera (i.e., the front camera 31 or rear camera 32) is a device for capturing an image (i.e., a still image or moving image). The camera may include one or more of image sensors, lenses, camera controllers, image processing processors, and flashes. The camera may capture the image for obtaining the biometric information of the companion animal. Camera characteristics (e.g., focus and exposure) may be controlled so that a feature object for obtaining the biometric information of the companion animal may be appropriately identified. The front camera 31 is a camera that captures an image in a display direction of the display 20 as shown in FIG. 1, and the rear camera 32 is a camera that captures an image in a direction opposite to the display direction of the display 20 as shown in FIG. 2. The camera may include not only a camera built into the electronic apparatus 1 but also an external camera coupled to the electronic apparatus 1 by wire or wirelessly.

The processor 40 may control calculation and data processing for performing operations of the electronic apparatus 1, and may control each module of the electronic apparatus 1. The processor 40 may execute one or more software programs stored in the memory 50. The processor 40 may include a general-purpose processor (e.g., a CPU) for executing an operating system that manages the overall operations of the electronic apparatus 1. In addition, the processor 40 may include a dedicated processor (e.g., a GPU, an NPU, etc.) for specific calculation processing. The processor 40 may include one or more processing circuits. The processor 40 may perform the data processing and control operations for obtaining biometric information of a companion animal.

The memory 50 may store the operating system for operating the electronic apparatus 1, programs such as applications, and data used in processes of executing the programs. The memory 50 may include a volatile memory (e.g., a DRAM) and a non-volatile memory (e.g., a flash memory). The memory 50 may store images for obtaining the biometric information of the companion animal.

Figure 4:
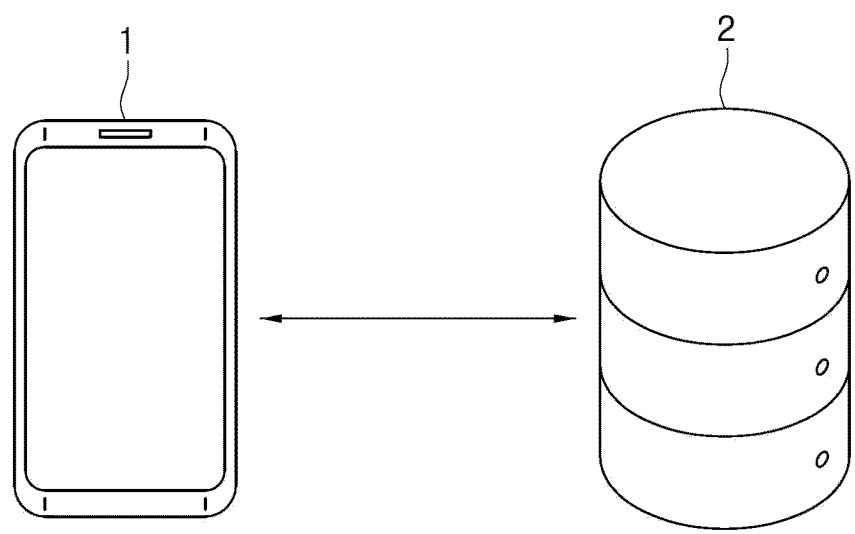
FIG. 4 is a view illustrating the electronic apparatus for obtaining biometric information of a companion animal, and illustrating a server for processing the biometric information.

The communication module 60 provides an environment in which the electronic apparatus 1 may communicate with an external entity (e.g., a server, a base station, an IoT device, or a mobile device). The communication module 60 may include an antenna, an RF circuit, and a communication processor. The communication module 60 may provide data received from the external entity to the processor 40. The communication module 60 may convert data provided from the processor 40 and transmit the data to the external entity. The communication module 60 may receive image data, which is obtained for biometric authentication of the companion animal and provided from the processor 40, and transmit the image data to the server 2. As shown in FIG. 4, the electronic apparatus 1 may communicate with the server 2. The electronic apparatus 1 may obtain the biometric information of the companion animal and transmit the obtained biometric information to the server 2. The server 2 may store the biometric information in a database. The server 2 may perform data processing for learning or identification of the companion animal from the biometric information. The server 2 may generate identification information of the companion animal from the biometric information, and transmit the identification information of the companion animal to the electronic apparatus 1.

That is, according to the present disclosure, the electronic apparatus 1 for obtaining the biometric information of the companion animal includes the display 20, the front camera 31 for capturing the image in the display direction of the display 20, the processor 40 functionally coupled with the display 20 and front camera 31, and the memory 50 functionally coupled with the processor 40. In order to obtain the biometric information of the companion animal, the processor 40 captures the image of the companion animal through the front camera 31, outputs the image of the companion animal through the display 20, extracts a feature object from the image of the companion animal, and stores an image of the feature object in the memory 50.

Figure 5:
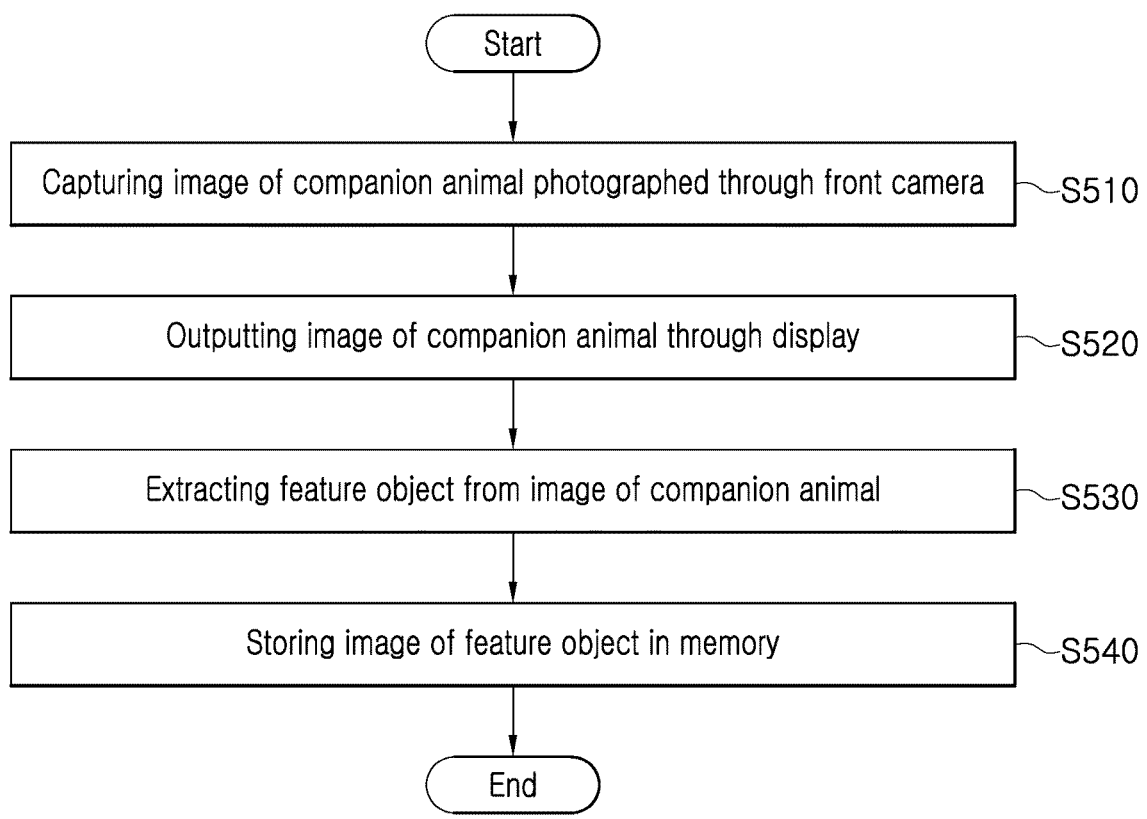
FIG. 5 is a flowchart illustrating a method of operating an electronic apparatus for obtaining biometric information of a companion animal according to the present disclosure.

FIG. 5 is a flowchart illustrating a method of operating an electronic apparatus 1 for obtaining biometric information of a companion animal according to the present disclosure. Hereinafter, the method of operating the electronic apparatus 1 for obtaining the biometric information of the companion animal according to the present disclosure may be performed by a processor 40. The method of operating the electronic apparatus 1 for obtaining the biometric information of the companion animal according to the present disclosure includes: step S510 of capturing an image of the companion animal through a front camera 31; step S520 of outputting the image through a display 20; step S530 of extracting a feature object from the image; and step S540 of storing the image of the feature object in a memory 50. The front camera 31 captures the image in a display direction of the display 20. Here, a photographing direction of the front camera 31 may correspond to the same direction as the display direction of the display 20, or may correspond to a direction within the substantially same range as that of the display direction (i.e., a direction within 0 degrees to 90 degrees).

Figure 6:
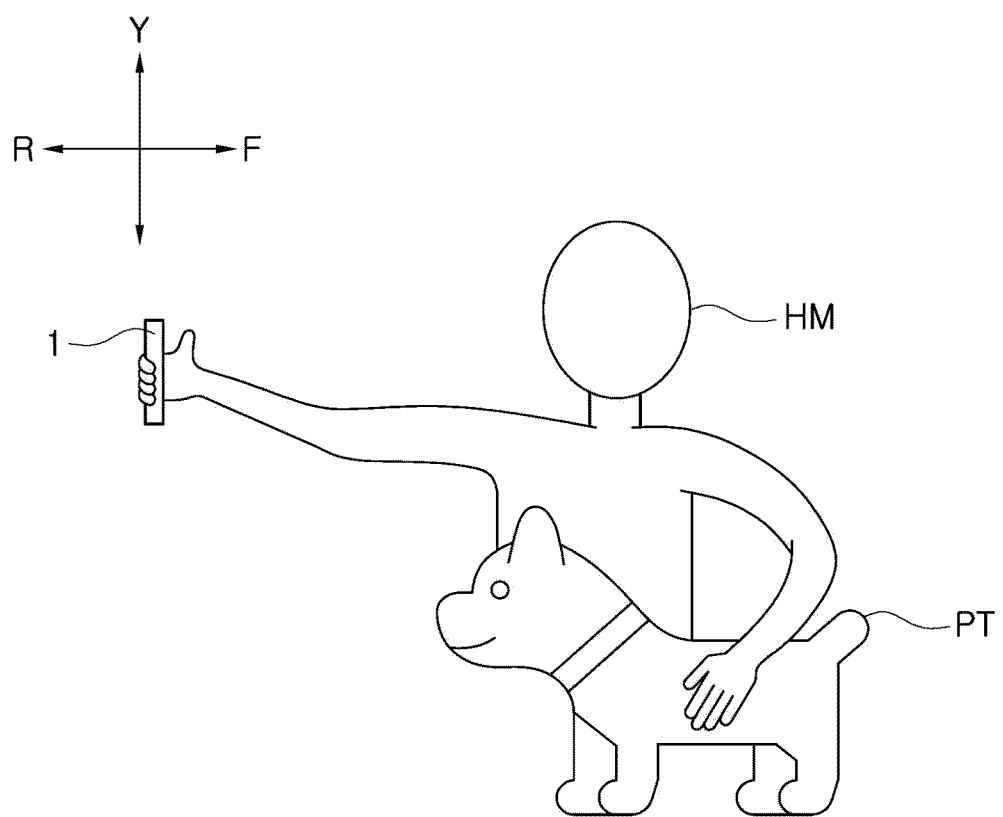
FIG. 6 is a view illustrating a method of obtaining the biometric information of the companion animal by using a front camera.

In the process of obtaining the biometric information of the companion animal by using the front camera 31, as shown in FIG. 6, the process may be performed by a user HM photographing the companion animal PT while holding the electronic apparatus 1. Compared with a case of using a rear camera 32, there are several strong points in photographing for obtaining the biometric information of the companion animal PT by using the front camera 31. In general, companion animals such as puppies don't recognize photographing, so the puppies don't stare at a camera, but look in other directions. In addition, since most companion animals have a habit of not being still and moving their heads continuously, it is very difficult to take a frontal photograph in a form suitable for biometric recognition. In addition, since most users are not skilled in the photographing, it is difficult for the most users to capture an image in the form suitable for the biometric recognition of a companion animal.

In contrast, when a companion animal is photographed by using the front camera 31 as shown in FIG. 6, a user may be able to check an image of the companion animal currently being photographed in real time, so the image in a form more suitable for the biometric recognition of the companion animal may be obtained. In addition, since the user may take the photograph while holding the companion animal and the photographing is performed while the user and companion animal are in a more comfortable state, the image more suitable for the biometric recognition may be obtained.

In step S510, the front camera 31 captures an image toward the front of the electronic apparatus 1 (i.e., in the display direction of the display 20). In order to obtain biometric information of a companion animal, the front camera 31 may capture the face of the companion animal. Prior to photographing the companion animal with the front camera 31, the processor 40 may determine whether to activate the front camera 31 or not. That is, the processor 40 may determine whether to capture, by using the front camera 31, the image for obtaining the biometric information of the companion animal. A process of determining whether to activate the front camera 31 or not will be described later with reference to FIG. 20. In addition, an application program for biometric recognition of the companion animal may be executed prior to the photographing the companion animal with the front camera 31.

Figure 7:
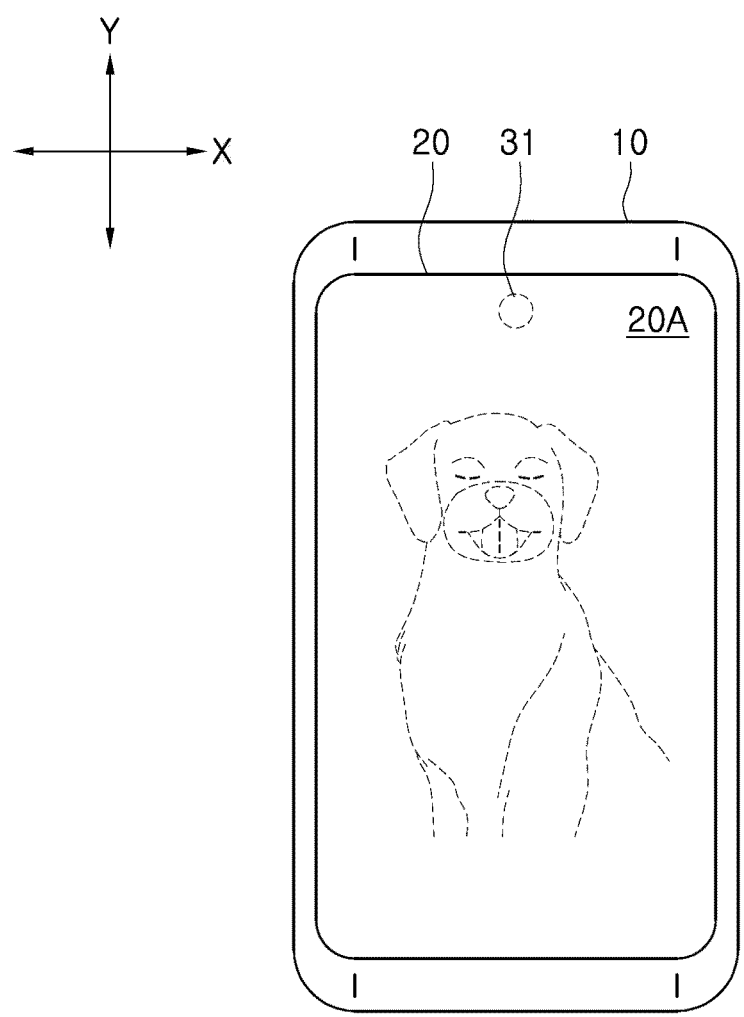
FIG. 7 is a view illustrating a case where a graphic is overlapped and displayed at a position of a feature object for biometric recognition of the companion animal.

In step S520, the image of the companion animal is output through the display 20. As shown in FIG. 7, the processor 40 may output, through the display 20, the image (i.e., a preview image) of the companion animal photographed through the front camera 31. In this case, a user interface of the application program for the biometric recognition of the companion animal may be output together. By outputting the image of the companion animal through the display 20, the user may check a current photographing state of the companion animal.

In step S530, the processor 40 extracts a feature object from the image of the companion animal. The feature object refers to an object having a different feature for each object for the biometric recognition of the companion animal. For example, feature objects may include face shapes, nose crease shapes, and irises. For example, the present document describes a process of obtaining a dog's nose image by using a nose crease shape (i.e., noseprint) as a feature object. The processor 40 may extract the feature object of an animal by using learning data and an object detection algorithm. According to the exemplary embodiment, the processor 40 may first detect a face area of the companion animal, and then detect a nose area within the face area. The processor 40 may extract a feature object for each captured image frame of the companion animal. In addition, the processor 40 may extract a feature object for every N-th image frame (where, N is a natural number greater than or equal to 2). For example, as shown in FIG. 7, the dog's nose area 100 may be detected as the feature object.

In step S540, the processor 40 stores the extracted image of the feature object in the memory 50. The processor 40 may store related information together with the image of the feature object. The related information may include user information, photographing time points, camera information, and illuminance information. The processor 40 may evaluate quality of the image of the feature object. That is, the method of operating the electronic apparatus 1 may further include performing quality evaluation on the image of the feature object. The processor 40 may determine whether the image of the corresponding feature object is an image suitable for biometric recognition by defining conditions for the quality evaluation and determining whether the image meets the quality conditions. The quality evaluation conditions may include sharpness, brightness, and size. According to the exemplary embodiment, the processor 40 may determine whether the image of the feature object is a frontal photograph of the companion animal or not. The processor 40 may transmit the image of the feature object satisfying the quality conditions to a server 2 through a communication module 60. That is, the method of operating the electronic apparatus 1 may further include transmitting the image of the feature object to the server 2 when the image quality of the feature object meets criteria. In addition, the processor 40 may perform image processing for converting the image of the feature object into a form suitable for biometric recognition.

Thereafter, the server 2 may perform processing, learning, or biometric recognition on the image of the feature object. The server 2 may extract a feature value from the image of the feature object. In a case of a companion animal registration procedure, the server 2 may store, in a database, the image and feature value of the feature object, and identification information of the corresponding companion animal. In a case of a companion animal identification procedure, the server 2 may search for a (similar) companion animal matching the extracted feature value, and transmit the identification information of the companion animal to the electronic apparatus 1.

Figure 8:
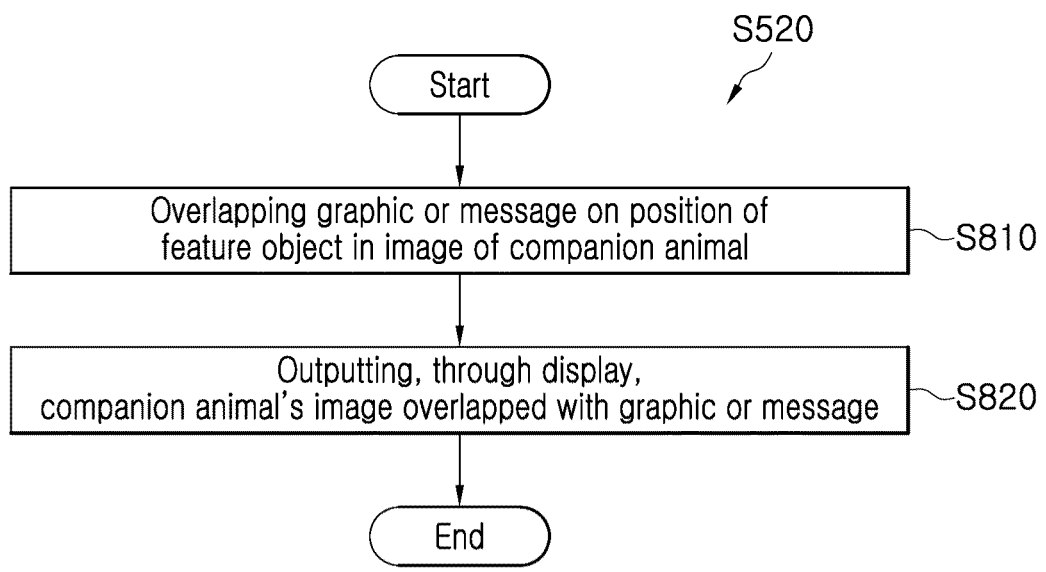
FIG. 8 is a flowchart illustrating a process of outputting a graphic or message representing a photographing state in an image of the companion animal.
Figure 9:
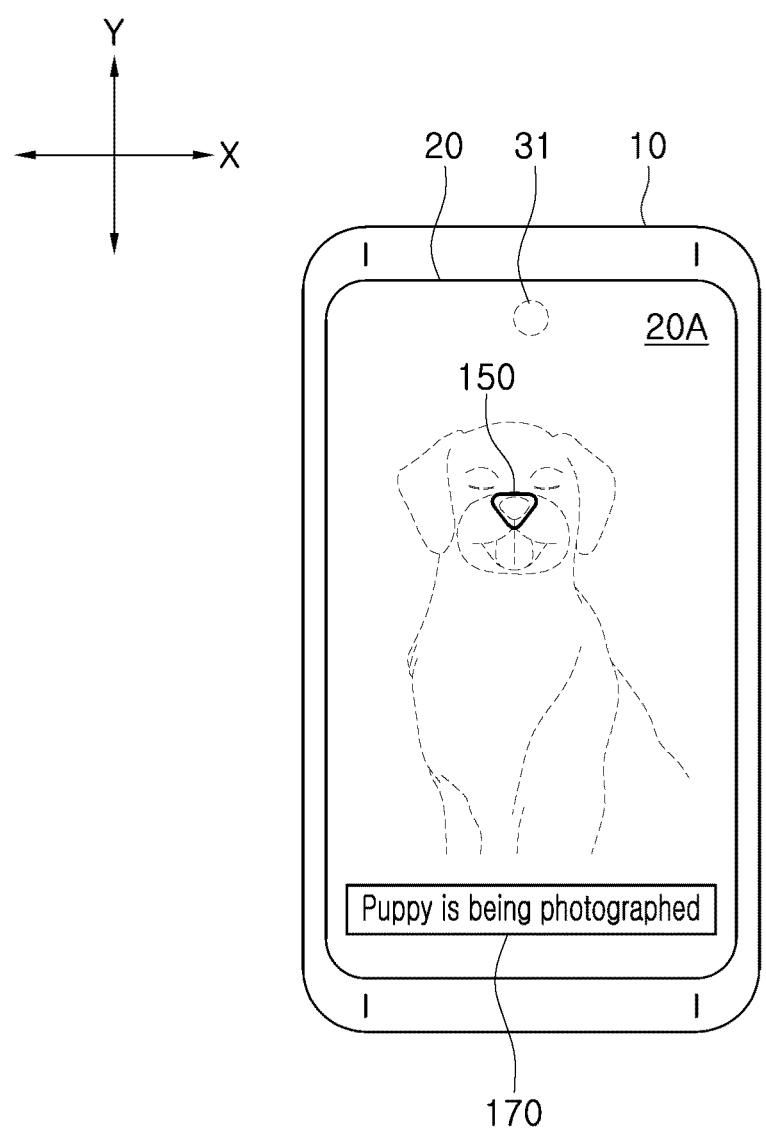
FIG. 9 is a view illustrating an example of the graphic representing the photographing state in the image of the companion animal.

According to the present disclosure, the processor 40 overlaps a graphic or message at a position of a feature object in an image of a companion animal, and outputs the companion animal's image overlapped with the graphic or message through the display 20. the graphic or message indicates a photographing state of the feature object. Referring to FIG. 8, step S520 of outputting the image of the companion animal includes: step S710 of overlapping the graphic or message at the position of the feature object in the image of the companion animal; and step S720 of outputting the companion animal's image overlapped with the graphic or message through the display 20. By outputting, as the graphic or message, the position of the feature object for the biometric recognition of the companion animal and the photographing state of the corresponding feature object, the user may determine whether the photographing for the biometric recognition of the companion animal is properly performed or not. For example, as shown in FIG. 9, the processor 40 may overlap and display a graphic 150 as a marker 200 at a position of a feature object of a companion animal. The graphic 150 may be an icon representing a photographing state of the companion animal. Depending on a quality evaluation result of the feature object, a shape or color of the graphic 150 may be displayed differently. In addition, the processor 40 may output a message 170 indicating information about the photographing state of the companion animal.

Figure 10:
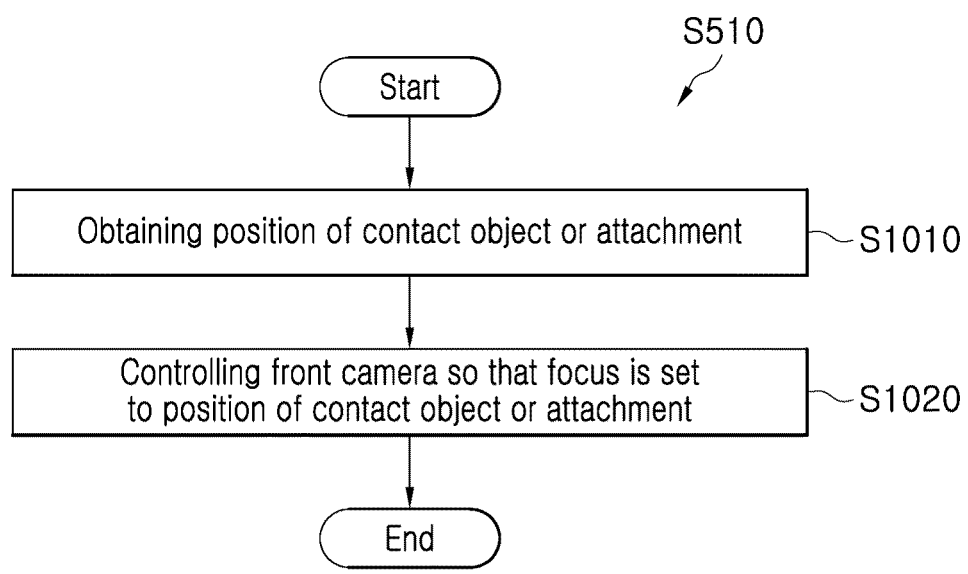
FIG. 10 is a flowchart illustrating a process of controlling a focus of the front camera by using an attachment attached to a display.
Figure 11:
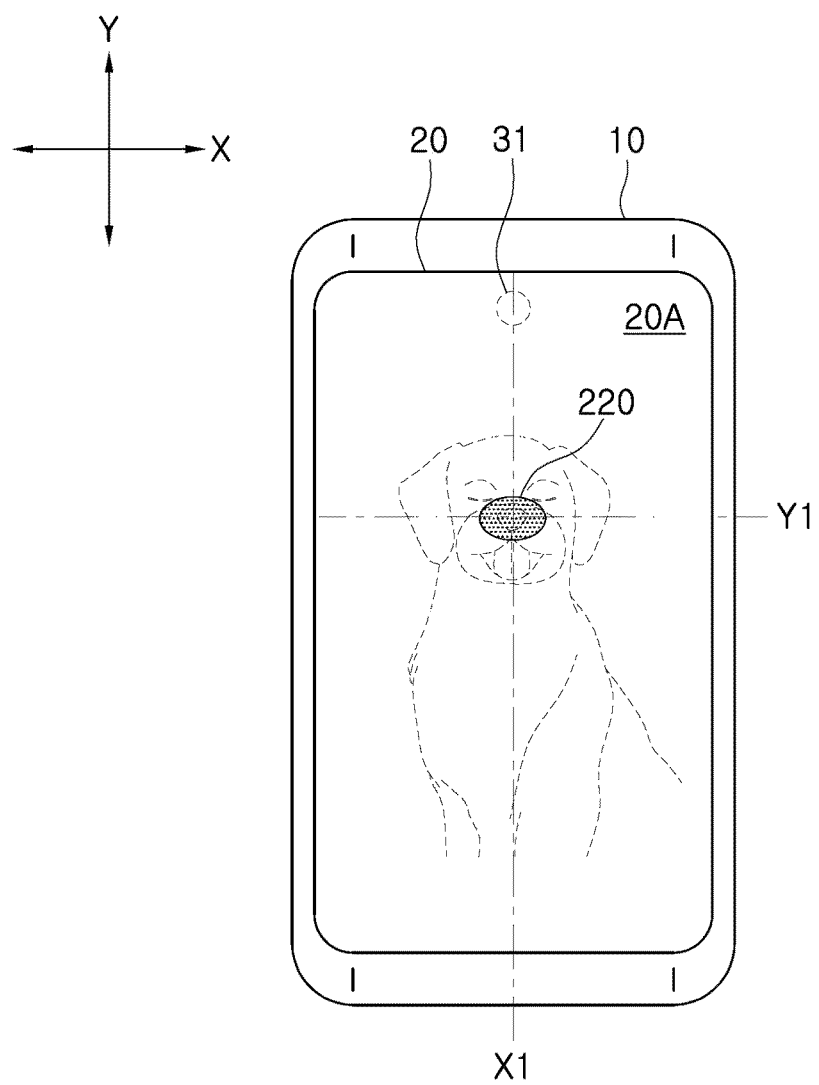
FIG. 11 is a view illustrating an example of the attachment attached to the display.

According to the present disclosure, the electronic apparatus 1 further includes a touch sensor 72 provided in a display area 20A of the display 20. From the touch sensor 72, the processor 40 may obtain a position of a contact object 210 that has come into contact with the display 20, and control the front camera 31 so as to set a focus to the position of the contact object 210. The contact object may be, for example, a hand or an electronic pen. As shown in FIG. 10, step S510 of capturing the image of the companion animal includes: step S1010 of obtaining, from the touch sensor 72, the position of a contact object 210 or attachment 220, which has come into contact with the display 20; and step S1020 of controlling the front camera 31 so as to set the focus to the position of the contact object 210 or attachment 220. As shown in FIG. 11, the attachment 220 may be attached to the display area 20A of the display 20 of the electronic apparatus 1. The attachment 220 may be physically attached to a surface of the display 20. The marker 200 and attachment 220 are objects that guide the user to position the feature object of the companion animal being photographed in a specific area. Not only a guide in a form of an icon displayed on the display 20, but also a physical attachment 220 may be used as the marker 200. The position (X1, Y2) of the attachment 220 is detected by the touch sensor 72, and the processor 40 may control a focus of the front camera 31 to be set to the detected position (X1, Y1). When the processor 40 determines the position of the feature object in the image, the marker 200 in the form of the icon displayed on the display moves to track the position of the detected object, and may be overlapped and displayed with the feature object. In this case, the processor 40 may control the focus of the front camera 31 to be set at the position of the marker 200.

As the exemplary embodiment, the display 20 may be configured to reflect some light, thereby functioning like a mirror. Since a shape of an animal is reflected on the display 20, the user may take a photograph for biometric recognition by using the front camera 31 while checking a companion animal's state.

Figure 12:
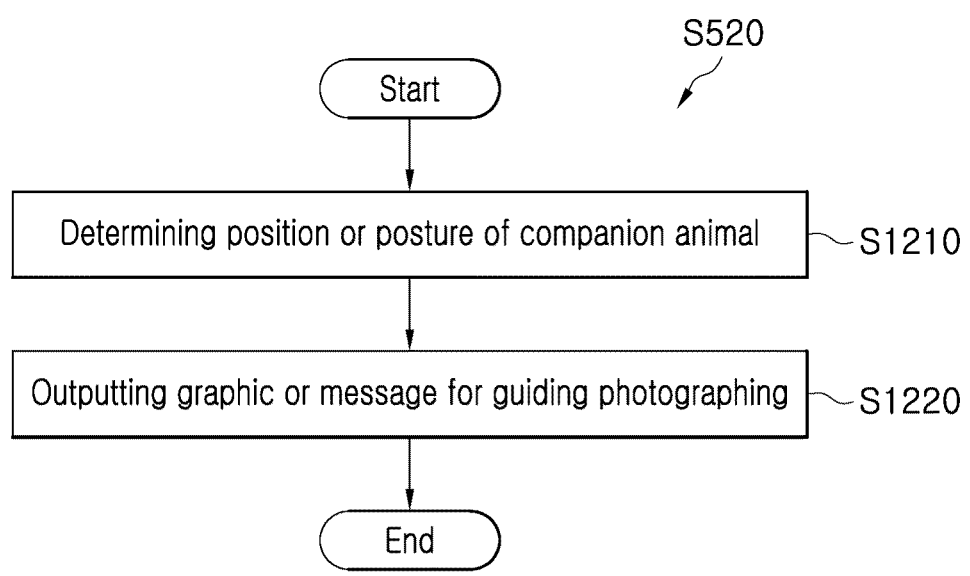
FIG. 12 is a flowchart illustrating a process of outputting a graphic or message for guiding photographing.
Figure 13:
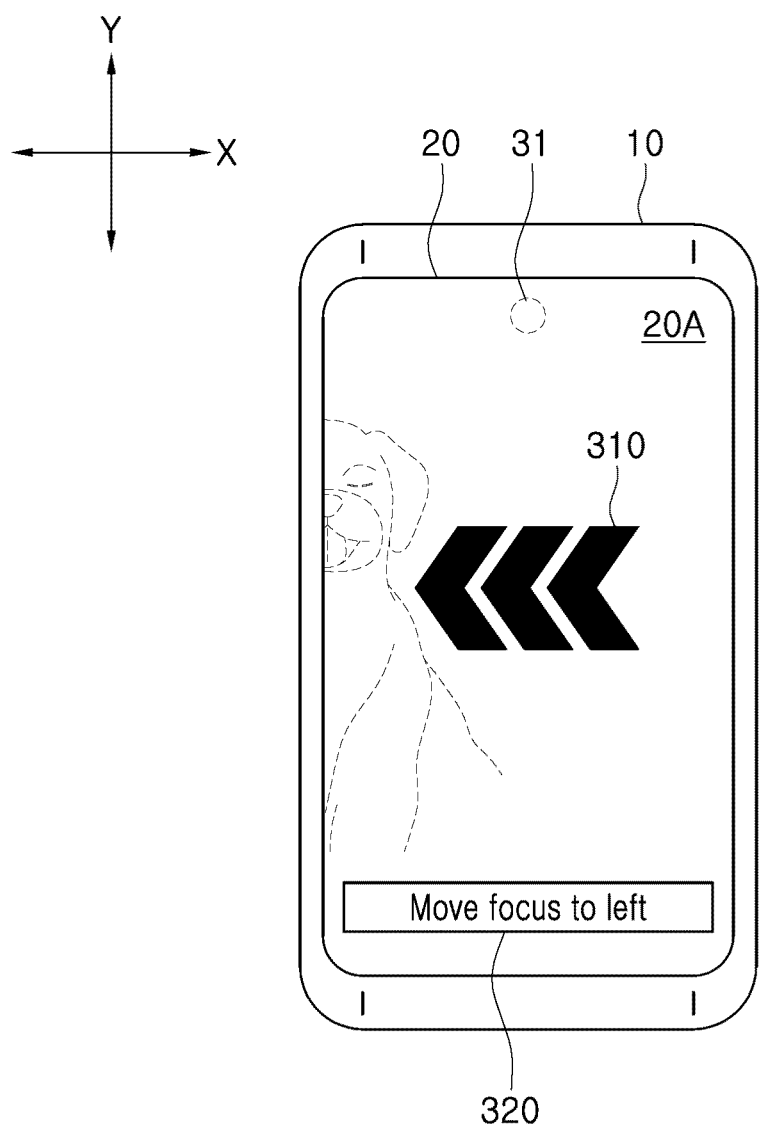
FIG. 13 is a view illustrating an example of a graphic and message for guiding photographing according to a position of the companion animal.

According to the present disclosure, the processor 40 determines a position or posture of the companion animal from the image of the companion animal, and outputs a graphic or message for guiding photographing based on the position or a posture of the companion animal through the display 20. Referring to FIG. 12, step S520 of outputting the image through the display 20 includes: step S1210 of determining the position or posture of the companion animal from the image of the companion animal; and step S1220 of outputting the graphic or message for guiding photographing based on the position or posture of the companion animal through the display 20. Referring to FIG. 13, when it is impossible to detect a feature object because a position of the companion animal being photographed is biased, the processor 40 may output a guide graphic 310 for guiding the user to rotate or move the electronic apparatus 1 to the position of the companion animal. In addition, as shown in FIG. 13, a message 320, which prompts the user to rotate or move the electronic apparatus 1 to the position of the companion animal, may be output.

Figure 14:
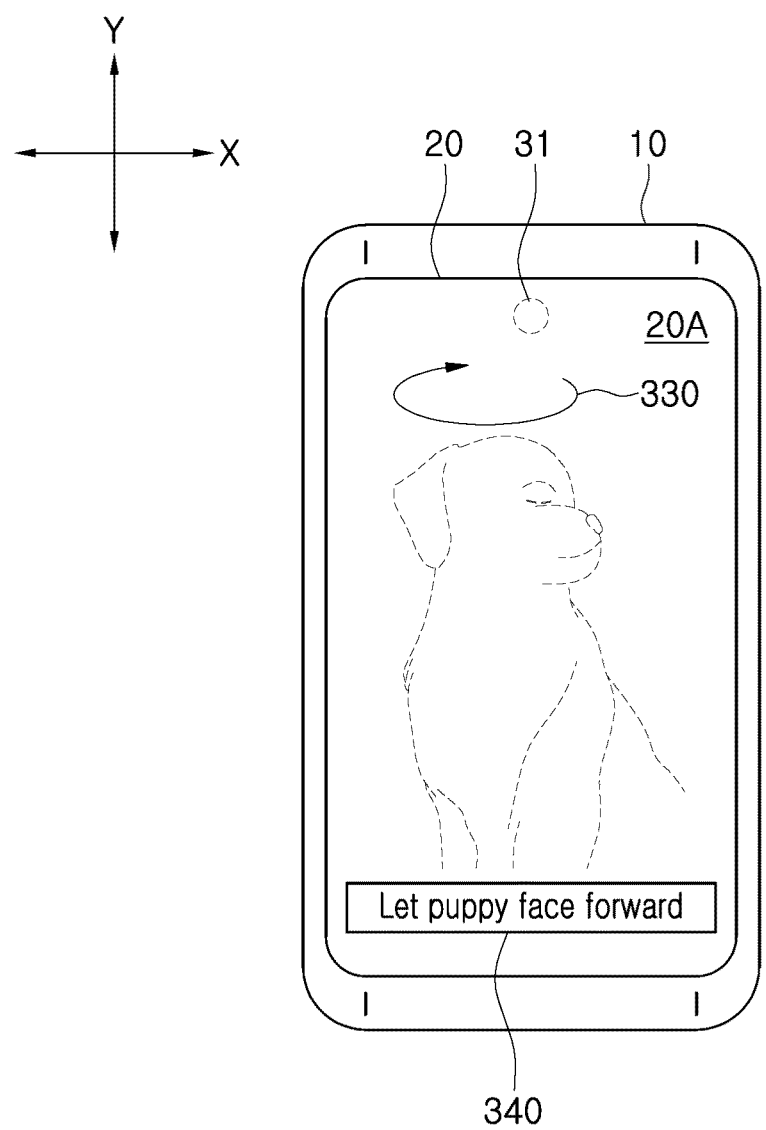
FIG. 14 is a view illustrating an example of a graphic and message for guiding photographing according to a posture of the companion animal.

As shown in FIG. 14, in a case where the companion animal turns its head and a frontal photograph is unable to be obtained, the processor 40 may output a guide graphic 330 or a guide message 340, which is for guiding the user to obtain the frontal photograph of the companion animal. The processor 40 may detect a rotation direction of the companion animal's face. The processor 40 may output the guide graphic 330 or guide message 340, which is for guiding the user to induce the companion animal to turn its head in a direction opposite to the rotation direction of the companion animal's face.

Figure 15:
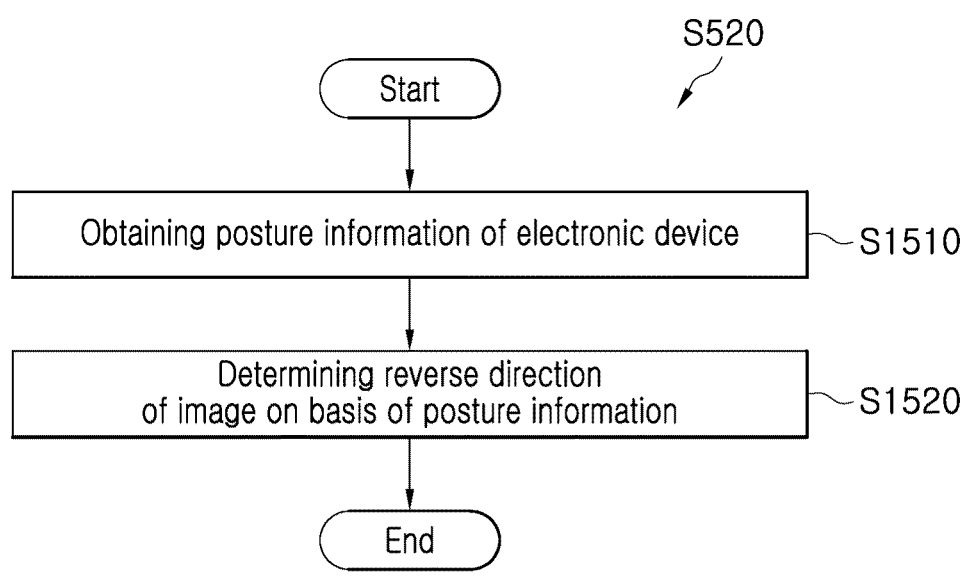
FIG. 15 is a flowchart illustrating a process of determining a reverse direction based on posture information of the electronic apparatus.

According to the present disclosure, the electronic apparatus 1 further includes a gyro sensor 71 for measuring a posture of the electronic apparatus 1. The processor 40 may obtain posture information of the electronic apparatus 1 from the gyro sensor 71 and determine a reverse direction of the image based on the posture information. Referring to FIG. 15, step S520 of outputting the image through the display 20 includes: step S1510 of obtaining the posture information of the electronic apparatus 1 from the gyro sensor 71; and step S1520 of determining the reverse direction of the image based on the posture information. When photographing is performed through the front camera 31, it is preferable to reverse and output the captured image to the display 20 for convenience of user recognition. The processor 40 may reverse the image captured by the front camera 31 with respect to a vertical axis (i.e., a Y axis) or a horizontal axis (i.e., an X axis), and output the reversed image through the display 20. When the gyro sensor 71 is not used, the processor 40 may determine a photographing direction of the companion animal from the photographed image and determine the reverse direction according to the photographing direction. In addition, the reverse direction may be determined according to the photographing direction input by the user.

Figure 16:
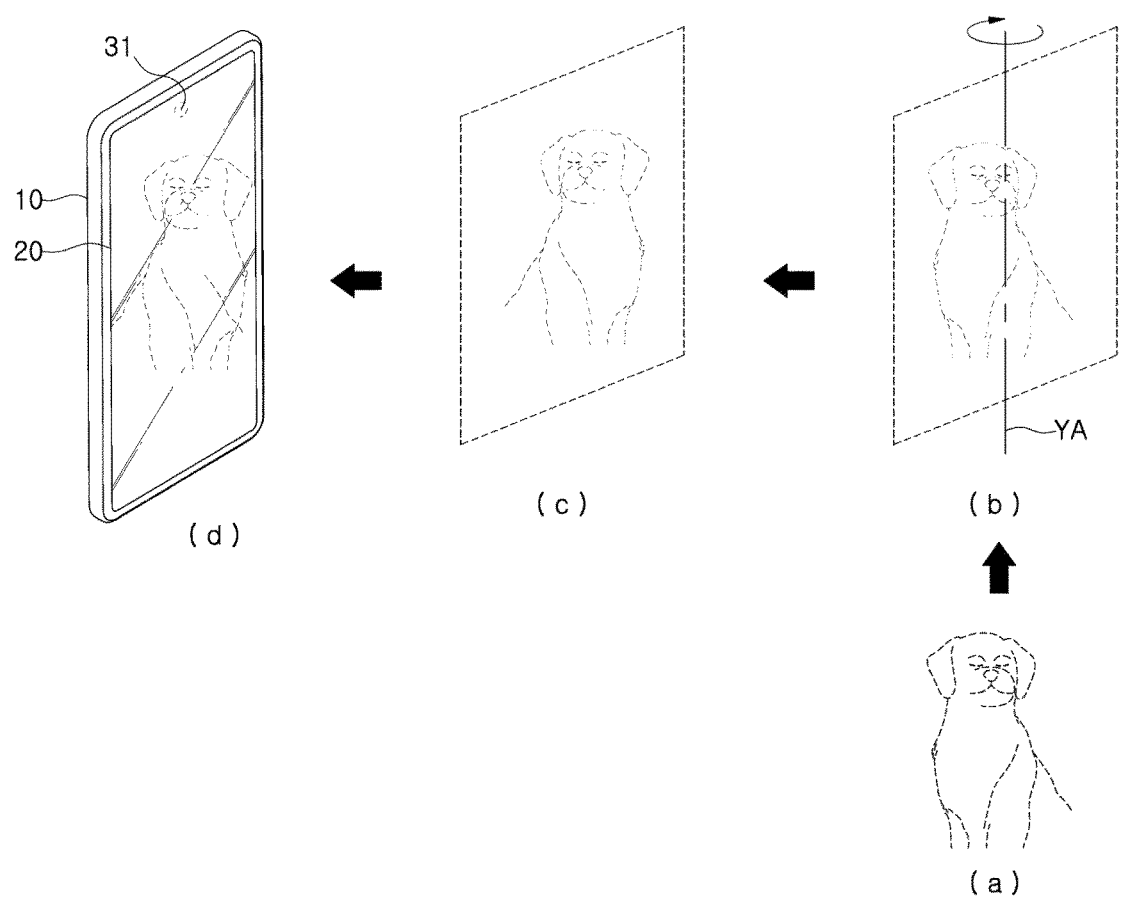
FIGS. 16 and 17 are respective views illustrating a process of reversing an image according to a posture of the electronic apparatus.
Figure 17:
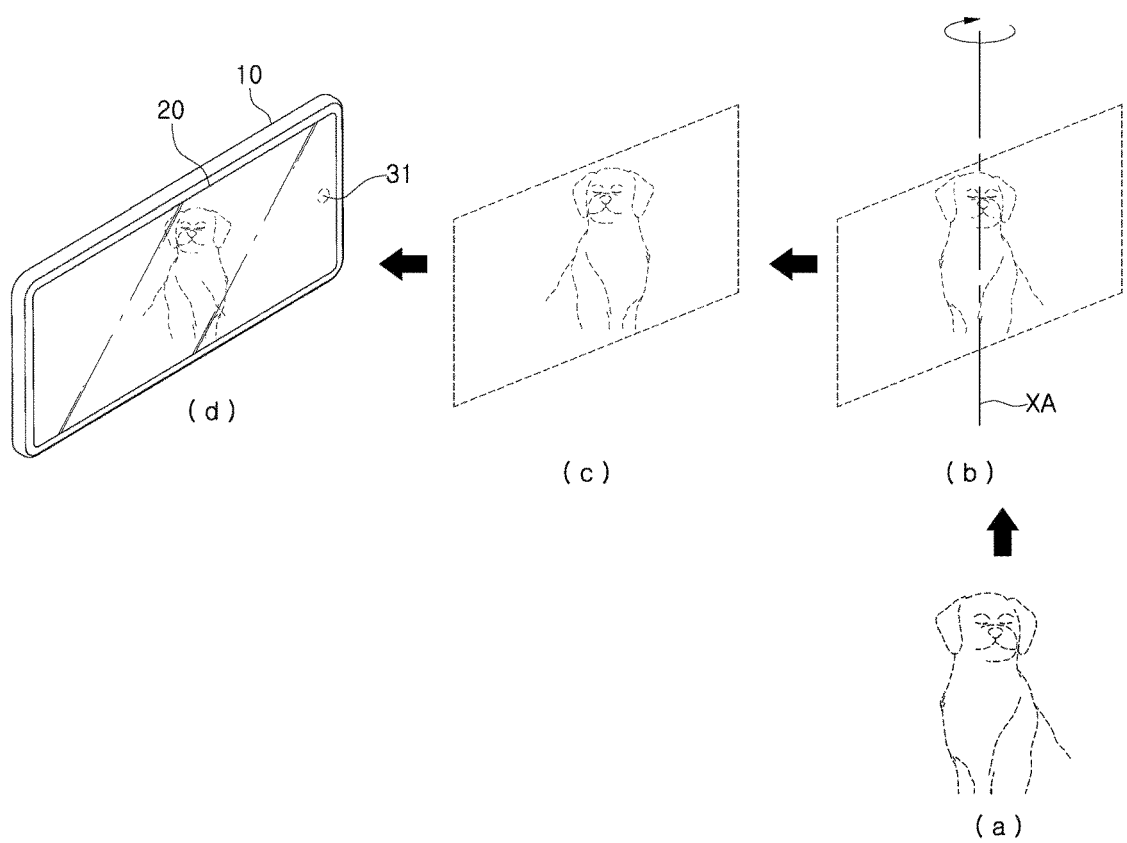

For example, as shown in FIG. 16, when the electronic apparatus 1 in a standing state (i.e., a portrait mode) captures an image of the companion animal, the processor 40 may reverse the image with respect to the vertical axis YA and output the reversed image to the display 20. As shown in FIG. 17, in a case where the electronic apparatus 1 in a lying state (i.e., a landscape mode) captures an image of the companion animal, the processor 40 may reverse the image with respect to the horizontal axis XA and output the reversed image to the display 20.

Figure 18:
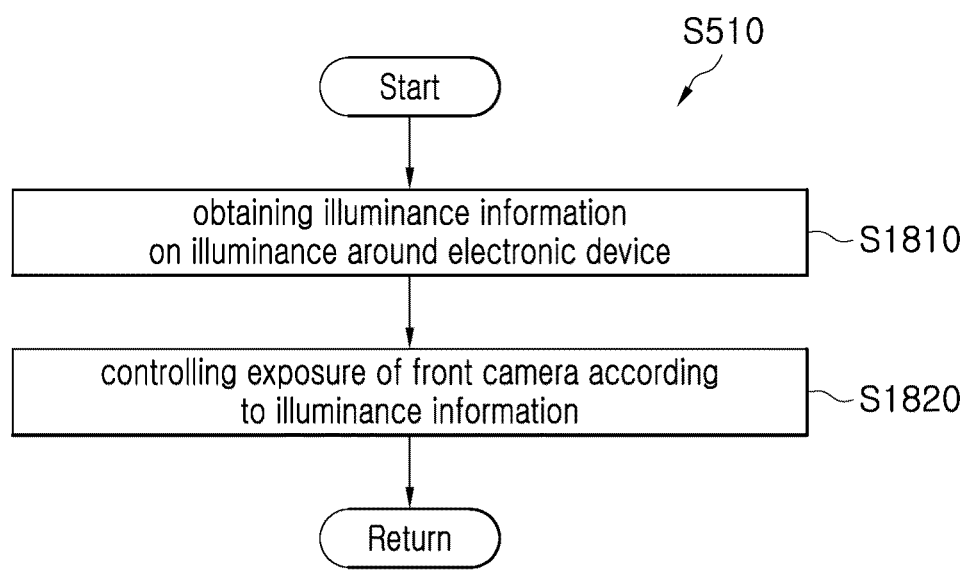
FIG. 18 is a flowchart illustrating a process of controlling exposure of a camera.
Figure 19:
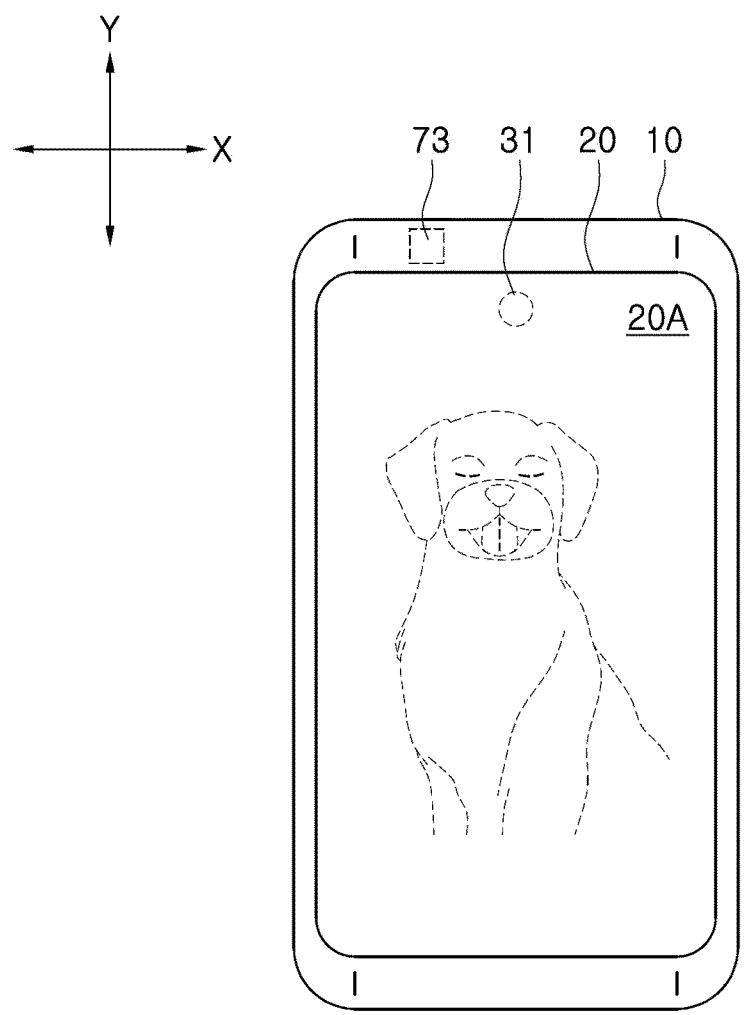
FIG. 19 is a view illustrating the electronic apparatus equipped with an illuminance sensor.

According to the present disclosure, the electronic apparatus 1 further includes an illuminance sensor 73 for measuring ambient illuminance. The processor 40 obtains illuminance information on illuminance around the electronic apparatus 1 from the illuminance sensor 73 and controls exposure of the front camera 31 according to the illuminance information. Referring to FIG. 18, step S510 of capturing the image of the companion animal includes: step S1810 of obtaining the illuminance information on the illuminance around the electronic apparatus 1 from the illuminance sensor 73; and step S1820 of controlling the exposure of the front camera 31 according to the illuminance information. As shown in FIG. 19, the illuminance sensor 73 may be provided on a front side of the electronic apparatus 1. Since the illuminance sensor 73 is installed adjacent to the display 20 and the front camera 31, when an image of the companion animal is captured through the front camera 31, the processor 40 may control an exposure amount of the front camera 31 by using illuminance information on illuminance measured by the illuminance sensor 73.

Meanwhile, according to the present disclosure, prior to taking a photograph for biometric recognition of a companion animal by using the front camera 31 of the electronic apparatus 1, a process of determining whether activation of the front camera 31 is possible may be performed. In many cases, the front camera 31 of the electronic apparatus 1 has a reduced function compared to that of the rear camera 32. Accordingly, when the companion animal is photographed by using the front camera 31, there is a possibility that an image unsuitable for the biometric recognition may be obtained. Accordingly, the processor 40 may first determine whether the front camera 31 is a camera suitable for the biometric recognition of the companion animal in advance, and activate the front camera 31 when it is determined that the front camera 31 is suitable, so as to photograph the companion animal. A process of determining whether to activate the front camera 31 or not may be performed at a time when an application program for biometric recognition of a companion animal is executed. The rear camera 32 is a camera that captures an image in a direction opposite to the front camera 31.

The processor 40 first executes a camera management program stored in the memory 50 of the electronic apparatus 1, and through the camera management program, checks a list (i.e., a camera ID list) of cameras built in or attached to the electronic apparatus 1. When there is a front camera 31 among the extracted cameras, the processor 40 may determine whether to capture an image through the front camera 31.

According to the present disclosure, the processor 40 checks the attribute information of the front camera 31, and determines whether the activation of the front camera 31 is possible based on the attribute information of the front camera 31. The attribute information of the front camera 31 may include whether manual focus is supported or not, a photographing format, a photographing size, and hardware level information. The attribute information of the front camera 31 may be stored as data of the camera management program. For example, in a case where the front camera 31 supports the manual focus, has the photographing format and photographing size thereof satisfying preset conditions, and has a hardware level thereof satisfying a reference level, the processor 40 may determine the front camera 31 as a camera that may be used to obtain biometric information of a companion animal.

The processor 40 may output, through the display 20, the attribute information of the front camera 31 and whether the activation of the front camera 31 is possible. By displaying the attribute information of the front camera 31 and whether the activation of the front camera 31 is possible, the user may check whether the front camera 31 can be used to obtain the biometric information of the companion animal.

In a case where the activation of the front camera is not possible, the processor 40 may activate the rear camera 32. That is, the processor 40 may perform photographing for the biometric recognition of the companion animal by using the rear camera 32 without activating the front camera 31.

Figure 21:
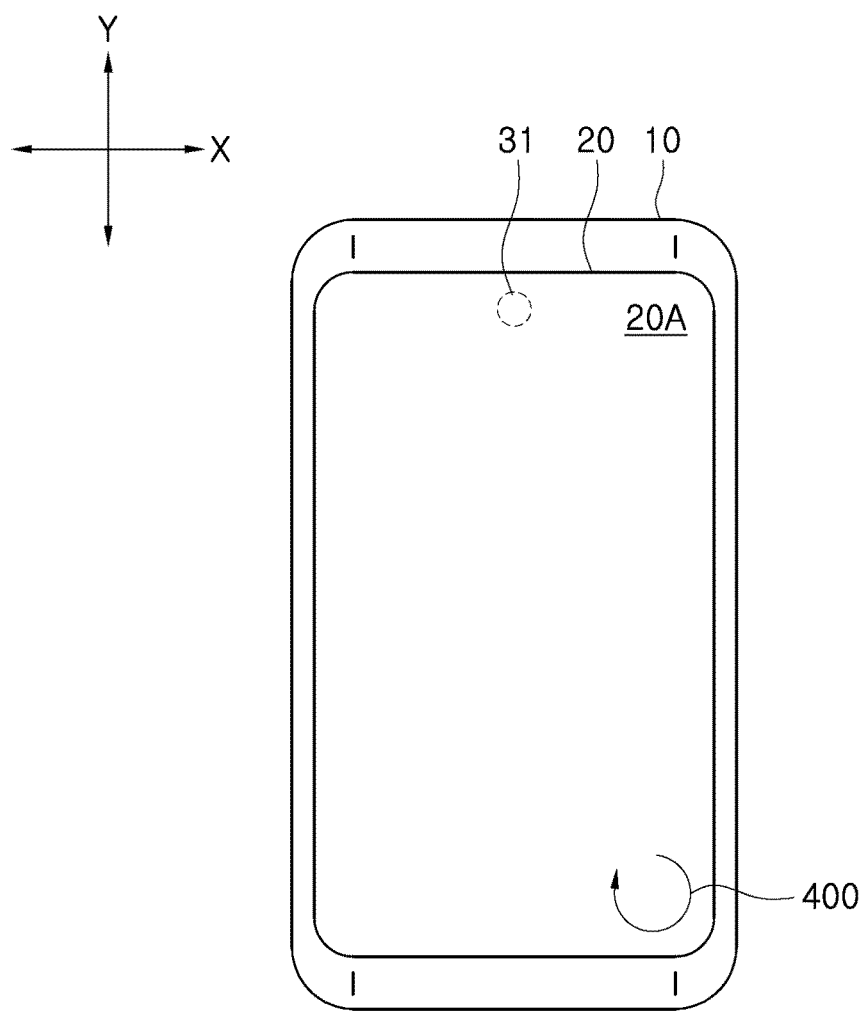
FIG. 21 is a view illustrating an example of an interface for allowing the front camera or rear camera to be selected.

When the activation of the front camera 31 is possible, the processor 40 may output an interface for selecting one of the front camera 31 and the rear camera 32. For example, when the activation of the front camera 31 is possible, the processor 40 may output the interface for enabling the user to select a camera. For example, while fundamentally displaying a preview image by activating the rear camera 32, the processor 40 may output an icon 400, which is capable of switching the cameras, at a lower right corner of an application screen as shown in FIG. 21. In a case where a touch input to the icon 400 is detected by the touch sensor 72, the processor 40 may activate the front camera 31 and display an image, captured by the front camera 31, on the display 20 as a preview image. When a touch input to the icon 400 is detected again while the front camera 31 is photographing, the processor 40 may output an image, captured by the rear camera 32, again to the display 20 as a preview image. As another example, a list that enables the user to select one of the front camera 31 and the rear camera 32 may be output before photographing is started.

In the case where the front camera 31 is selected, the processor 40 activates the front camera 31 to obtain an image for the biometric recognition of the companion animal. In the case where the rear camera 32 is selected, the processor 40 activates the rear camera 32 to obtain an image for the biometric recognition of the companion animal.

Figure 20:
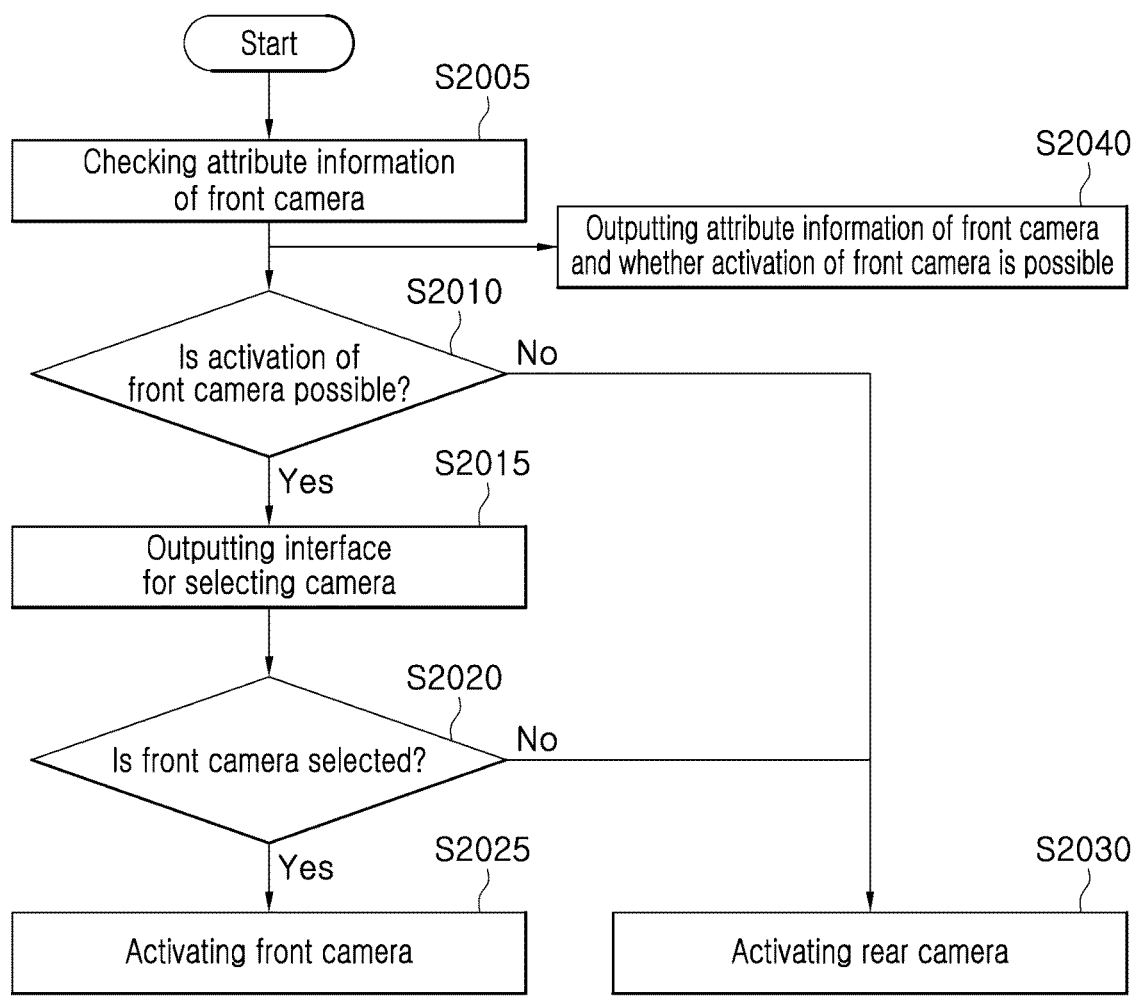
FIG. 20 is a flowchart illustrating a process of activating a front camera or a rear camera.

That is, the method of operating the electronic apparatus 1 according to the present disclosure includes determining whether the front camera 31 is activated. As shown in FIG. 20, the determining of whether to active the front camera 31 or not includes: step S2005 of checking the attribute information of the front camera 31; and step S2010 of determining whether the activation of the front camera 31 is possible based on the attribute information of the front camera 31. Step S2040 of outputting, through the display 20, the attribute information of the front camera 31 and whether the activation of the front camera 31 is possible may be executed. When the activation of the front camera 31 is possible, step S2015 of outputting the interface for selecting one of the front camera 31 and the rear camera 32 may be executed. Through the interface, steps are executed, the steps including: step S2020 of determining whether the front camera 31 is selected or not; step S2025 of activating the front camera 31 when the front camera 31 is selected; and step S2030 of activating the rear camera 32 when the front camera 31 is not selected. Thereafter, the process of capturing the image for the biometric recognition of the companion animal may be executed through the selected camera.

Meanwhile, after the image of the feature object for the biometric recognition of the companion animal is obtained through the front camera 31 or the rear camera 32, the quality evaluation for determining whether the image of the corresponding feature object is suitable or not for the learning or identification of the companion animal may be performed. According to the present disclosure, the processor 40 may evaluate the quality of the image of the feature object. The conditions defined to evaluate the image quality of the feature object may include sharpness, brightness, and size. The quality evaluation conditions may be different depending on whether the camera that has captured the image of the feature object is the front camera 31 or the rear camera 32. For example, when image quality is determined through a size of an image of the feature object, a size in a size condition of the image captured by the front camera 31 may be set to be larger than that of the rear camera 32. In general, the front camera 31 is configured with a camera with lower performance than that of the rear camera 32. For example, the overall image quality of the front camera 31 is lower than that of the rear camera 32, and may not support an Optical Image Stabilization (OIS) function, which is a hand shake prevention function. Accordingly, quality evaluation of an image of a feature object obtained through the rear camera 32 may be performed with a higher level of quality conditions than that of quality conditions applied when an image is captured through the front camera 31. Thus, even when an image is captured through the front camera 31, the biometric recognition of the companion animal may be smoothly performed through the image of the feature object.

Figure 22:
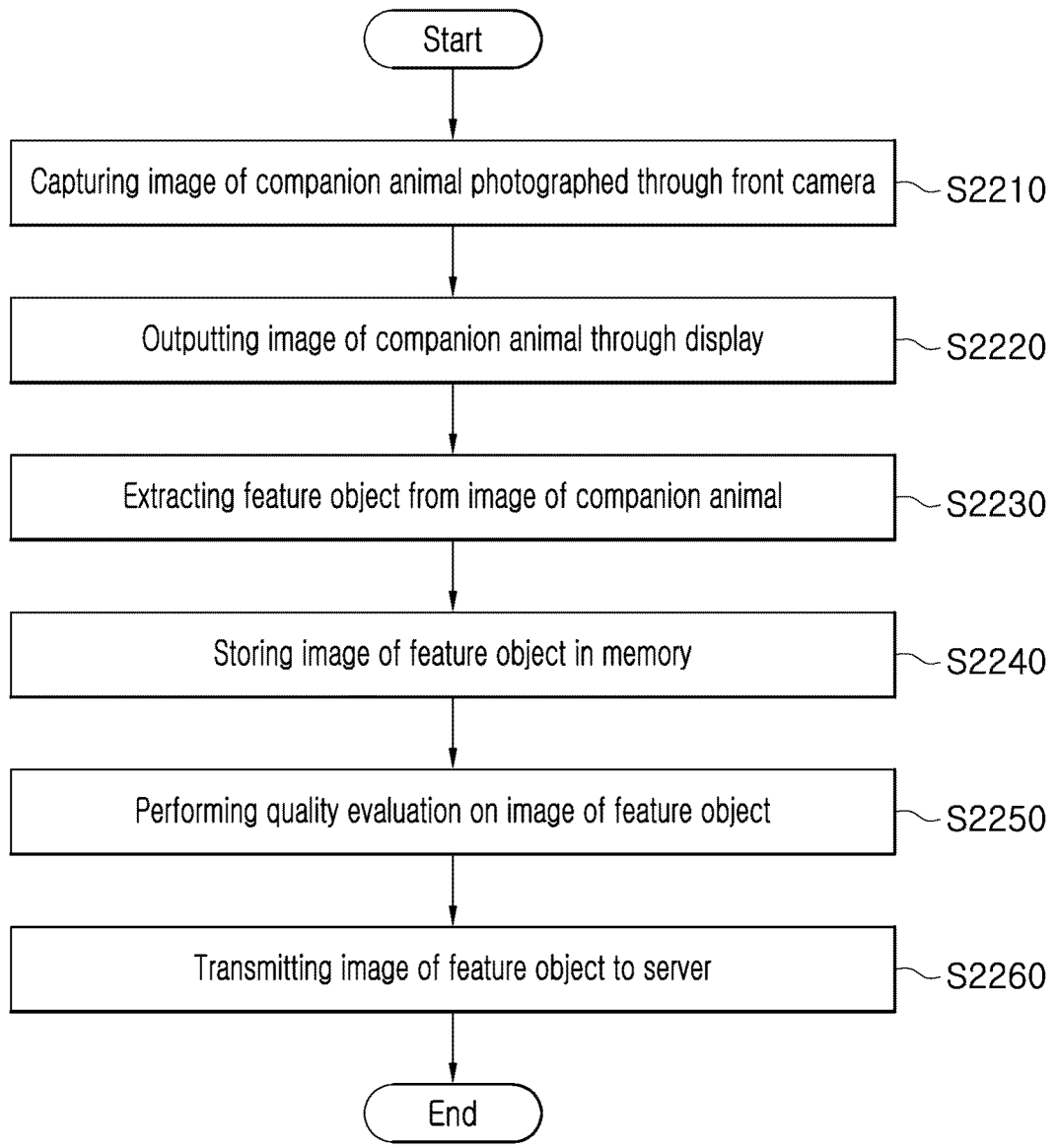
FIG. 22 is a flowchart illustrating a method of operating an electronic apparatus including processes of quality evaluation and image transmission.

As shown in FIG. 22, the method of operating the electronic apparatus 1 includes: step S2210 of capturing an image of a companion animal through the front camera 31; step S2220 of outputting the image through the display 20; step S2230 of extracting a feature object from the image; step S2240 of storing the image of the feature object in the memory 50; step S2250 of evaluating quality of an image of the feature object; and step S2260 of transmitting the image of the feature object satisfying quality conditions to the server 2 through the communication module 60. The quality evaluation conditions are set to be different depending on whether the camera, which has captured the image of the feature object, is the front camera 31 or the rear camera 32.

When the image of the feature object is transmitted to the server 2, the processor 40 of the electronic apparatus 1 may transmit camera information as related information about the camera, which has captured the corresponding image, together with image data. The server 2 may identify which camera has taken the photograph through the camera information. The server 2 may determine a method of processing the feature object through the camera information. That is, the server 2 may process the image differently depending on whether the camera, which has captured the image, is the front camera 31 or the rear camera 32.

The present exemplary embodiment and the accompanying drawings in this specification only clearly show a part of the technical idea included in the present disclosure, and it will be apparent that all modifications and specific exemplary embodiments that can be easily inferred by those skilled in the art within the scope of the technical spirit contained in the specification and drawings of the present disclosure are included in the scope of the present disclosure.

Therefore, the spirit of the present disclosure should not be limited to the described exemplary embodiments, and all things equal or equivalent to the claims as well as the claims to be described later fall within the scope of the concept of the present disclosure.

The invention claimed is:

1. An electronic apparatus for obtaining biometric information of a companion animal including animals other than human having physical features for biometric identification, the electronic apparatus comprising:
   a display;
   a front camera configured to capture an image in a display direction of the display;
   a rear camera for capturing an image in a direction opposite to the display direction of the display;
   a processor functionally coupled to the display and the front camera; and
   a memory functionally coupled with the processor,
   wherein the processor is configured to:
      check attribute information of the front camera;
      determine whether activation of the front camera is possible based on the attribute information of the front camera;
      if the activation of the front camera is possible, captures the image of the companion animal through the front camera;
      outputs the image of the companion animal through the display;
      extracts a feature object from the image of the companion animal; and
      stores an image of the feature object in the memory.

2. The electronic apparatus of claim 1, wherein the processor overlaps a graphic or message at a position of the feature object in the image of the companion animal, and outputs the image of the companion animal overlapped with the graphic or message through the display.

3. The electronic apparatus of claim 2, wherein the graphic or message represents a photographing state of the feature object.

4. The electronic apparatus of claim 1, further comprising:
   a touch sensor provided in a display area of the display,
   wherein the processor obtains, from the touch sensor, a position of a contact object or attachment, which has come into contact with the display, and controls the front camera to set a focus to the position of the contact object or attachment.

5. The electronic apparatus of claim 1, wherein the processor displays a marker on a display area of the display and tracks a position of the feature object, so as to move the marker so that the marker overlaps the feature object and to control the front camera so that a focus is set to a position of the marker.

6. The electronic apparatus of claim 1, wherein the processor determines a position or posture of the companion animal from the image of the companion animal, and outputs, through the display, a graphic or message for guiding photographing based on the position or the posture of the companion animal.

7. The electronic apparatus of claim 1, further comprising:
   a gyroscope sensor for measuring a posture of the electronic apparatus,
   wherein the processor obtains posture information of the electronic apparatus from the gyroscope sensor, and determines a reverse direction of the image based on the posture information.

8. The electronic apparatus of claim 1, further comprising:
   an illuminance sensor for measuring illuminance around the electronic apparatus,
   wherein the processor obtains illuminance information on the illuminance around the electronic apparatus from the illuminance sensor, and controls exposure of the front camera according to the illuminance information.

9. The electronic apparatus of claim 1, wherein the attribute information of the front camera comprises whether manual focus is supported or not, a photographing format, and a photographing size.

10. The electronic apparatus of claim 1, wherein the processor outputs, through the display, the attribute information of the front camera and whether the activation of the front camera is possible.

11. The electronic apparatus of claim 1, wherein the processor activates the rear camera when the activation of the front camera is not possible.

12. The electronic apparatus of claim 1, wherein, when the activation of the front camera is possible, the processor outputs, through the display, an interface for selecting one of the front camera and the rear camera.

13. The electronic apparatus of claim 1, wherein the processor evaluates quality of the image of the feature object, and transmits the image of the feature object satisfying quality evaluation conditions to a server through a communication module, and
- wherein the quality evaluation conditions are set to be different depending on whether a camera capturing the image of the feature object is the front camera or the rear camera.

14. A method of operating an electronic apparatus for obtaining biometric information of a companion animal including animals other than human having physical features for biometric identification, the method comprising:
- checking attribute information of a front camera;
- determining whether activation of the front camera is possible based on the attribute information of the front camera;
- if the activation of the front camera is possible, capturing an image of the companion animal through the front camera;
- outputting the image through a display;
- extracting a feature object from the image; and
- storing an image of the feature object in a memory,
- wherein the front camera captures an image in a display direction of the display.

\* \* \* \* \*